April 21, 1931.  J. C. MARTIN, JR  1,802,309

PLUG VALVE

Filed June 16, 1926  2 Sheets-Sheet 1

Witness:
Fred E. Burson

Inventor:
Jesse C. Martin Jr
By Attorney
Paul Carpenter

April 21, 1931.  J. C. MARTIN, JR  1,802,309
PLUG VALVE
Filed June 16, 1926  2 Sheets-Sheet 2

Patented Apr. 21, 1931

1,802,309

UNITED STATES PATENT OFFICE

JESSE C. MARTIN, JR., OF SAN FRANCISCO, CALIFORNIA

PLUG VALVE

Application filed June 16, 1926. Serial No. 116,261.

This invention relates in general to valves, and more particularly to lubricated plug valves and in the specific embodiment illustrated has to do with an improved form of gland and packing, and adjusting means for the valve.

While the invention will be described as applied to a valve capable of having a lubricant introduced thereinto, it will be understood, of course, that the invention per se from the standpoint of the packing and adjusting means may be adapted to other structures than that shown.

The principal objects and advantages of the present invention reside in the provision of a valve having an improved packing and gland and adjusting means therefor and for the valve; the provision of an improved packing and gland and improved valve adjusting means characterized by the provision of an improved supporting means therefor; the provision of a valve having a packing and packing gland, and an adjusting means for the gland and valve in which these elements have a common means of support; the provision of an improved valve wherein the valve may be displaced from its seat without disturbance of the packing; the provision of an improved valve wherein the packing may be renewed without placing the valve out of service; the provision of an improved valve wherein an adjusting means for moving the valve relatively to its seat is provided, capable of operation independently of the packing elements; and the provision of a valve structure of the character referred to which is simple in construction, compact and capable of universal application to valves of the general type disclosed.

The foregoing and such other objects and advantages as may appear or may be pointed out as this description proceeds are obtained in the structural embodiment illustrated in the accompanying drawings wherein—

Figure 1:
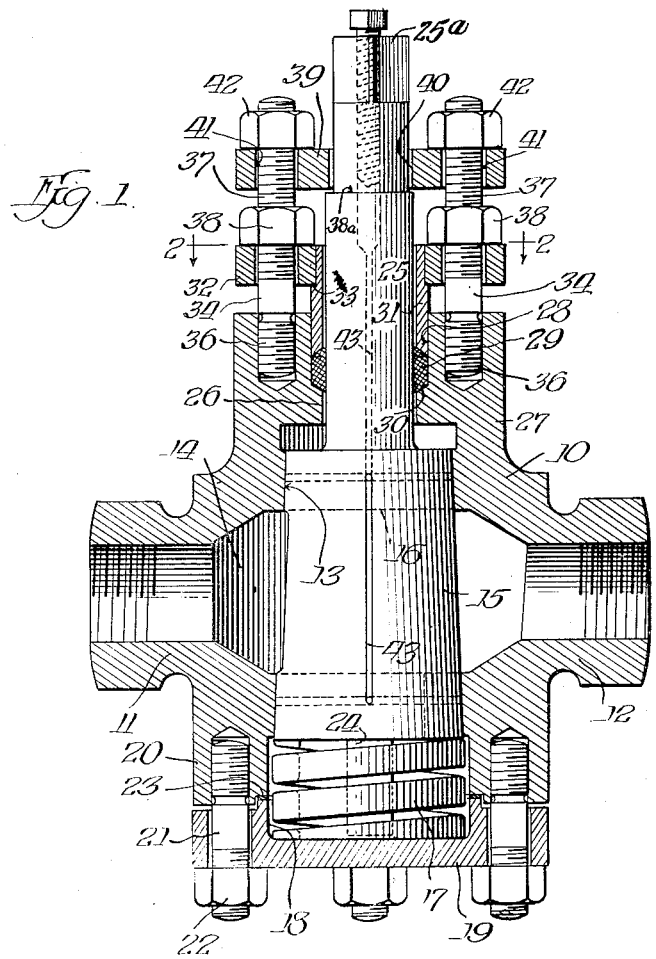
Figure 1 is a vertical sectional view of a valve constructed in accordance with the present invention.
Figure 2:
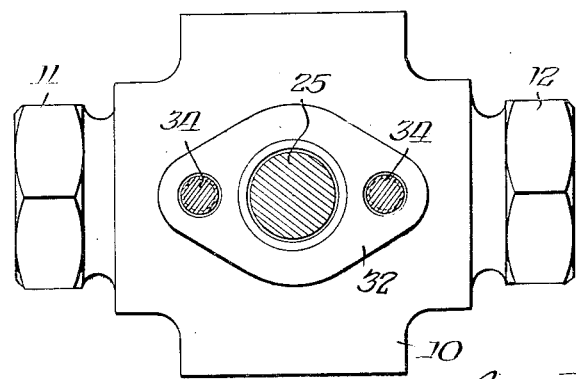
Figure 2 is a top plan view of the device of Figure 1, parts being shown in section on the line 2—2.

Referring now more particularly to the drawing, it will be observed that a casing or body 10 is provided, said body having lateral oppositely disposed extensions 11 and 12 internally threaded, as shown, for connection to fluid conductors, not shown.

In the embodiment of the invention herein disclosed, the body 10 is provided with a tapering bore 13, forming a valve seat and said bore extending transversely through the fluid passageway 14 of the valve. Within the bore 13 there is mounted a plug valve member 15 of a generally tapering configuration and provided with a transverse fluid passageway 16 adapted to register with the passageway 14 when properly positioned.

As the plug member 15 and the seat 13 are tapering, the plug is of course introduced from the bottom as shown in Figure 1, and in order to maintain the plug snugly on its seat and yet yieldingly so as to permit of the introduction of a lubricant, as will appear, I provide a yieldingly resistant means such as a helical spring 17 engaging the outer end of the plug 15 and seating in a pocket 18, formed in a retaining cap 19. The retaining cap is securely fixedly attached to an enlarged portion 20 of the body 10 by the provision of bolts 21 having nuts 22. A suitable packing 23 prevents leakage around the joint between the cap 19 and the body 10. A stud 24 may be provided on the plug 15 for limiting the displacement longitudinally of said plug.

In order to rotate the plug 15 for opening and closing the passageway 14, the plug is provided with a stem 25 squared at 25a, which projects through an opening 26 in an enlarged head 27 of the body 10. The opening 26 is suitably enlarged as at 28 to form a compartment for receiving a packing member 29 engaging a shoulder 30 and the valve stem 25 as shown in Figure 1.

A gland member is provided including a tubular section 31 formed at its inner end, where it engages the packing 29, to cause said packing to snugly engage the stem 25. The outer end of the tubular section 31 receives a plate member 32 which may or may not be separably attached to the tubular member 31 and abut therewith by means of a shoulder 33. For guiding the gland member in operative position there are provided a pair of bolts 34 which pass through a pair of openings 35 in the plate 32, said bolts being threaded as at 36 into suitable openings in the head 27 and the outer-ends of said bolts being threaded as at 37 for reception of the nuts 38. Manipulation of the nuts 38 on the bolts 34 will cause the gland member to be impinged upon the packing.

In order to longitudinally displace the valve member 15 with respect to its seat, there is provided a circumferential shoulder 38a near the upper end of the valve stem 25, by reducing the valve stem in diameter at this point, and an adjusting plate 39 is provided with a suitable opening 40 to fit the reduced outer portion of the valve stem. The plate 39 is also provided with an opening 41 complemental to the bolts 34, and nuts 42 are engaged with the outer surface of the plate 39, and said bolts 37, so that by turning down on the nuts 42, said plate will be caused to abut the shoulder 38a and longitudinally displace the valve so as to permit of the introduction of a lubricant between the surface of the valve 15 and its seat. This displacement takes place against the tension of the spring 17 and a lubricant may be introduced into the valve through passageways generally indicated at 43.

It will be understood, of course, that the form of my invention shown in application, Serial No. 88,737, may be employed for introducing the lubricant, but where an old form of lubricating valve is provided, the present invention may be readily adapted thereto without material alteration in the valve structure and while the valve is still in service.

In replacing the packing 29, the nuts 42 may be backed off and the nuts 38 also backed off to permit the gland to be lifted beyond the upper end of the head 27, thereby leaving a space through which the new packing may be introduced. It will be observed that the gland member and the adjusting plate are both mounted on a common support thus reducing the cost of manufacturing and simplifying the construction and rendering more convenient the manipulation of the various parts.

It will be observed that the gland element 31, while compressing the packing 29 in Figure 1 is spaced away from the adjacent portion of the valve stem so that friction which would otherwise be set up between the gland and valve stem is eliminated and thus movement of the valve in its seat to open and close the same is facilitated, that is to say resistance to rotation of the plug member is reduced substantially to that set up by the valve engaging its seat and the relatively small area of the packing itself engaging the valve stem.

It is further pointed out that by the provision of the plate 39, and the spring 17, cooperating within limits a nicety of balancing of the valve on its seat is obtained. Adjustment of valves on their seats by members having nuts is well known, but it is to be understood that in the present invention, both in the forms shown in Figures 1 and 3, the balancing of the valve member on its seat by the provision of a spring and a plate 39 is such that the spring causes the valve to closely follow any adjustment made by the plate 39, and the spring at the same time permitting movement of the valve member from its seat in response to pressure established in the lubricant chamber by the lubricant screw 25$^b$.

Figure 3:
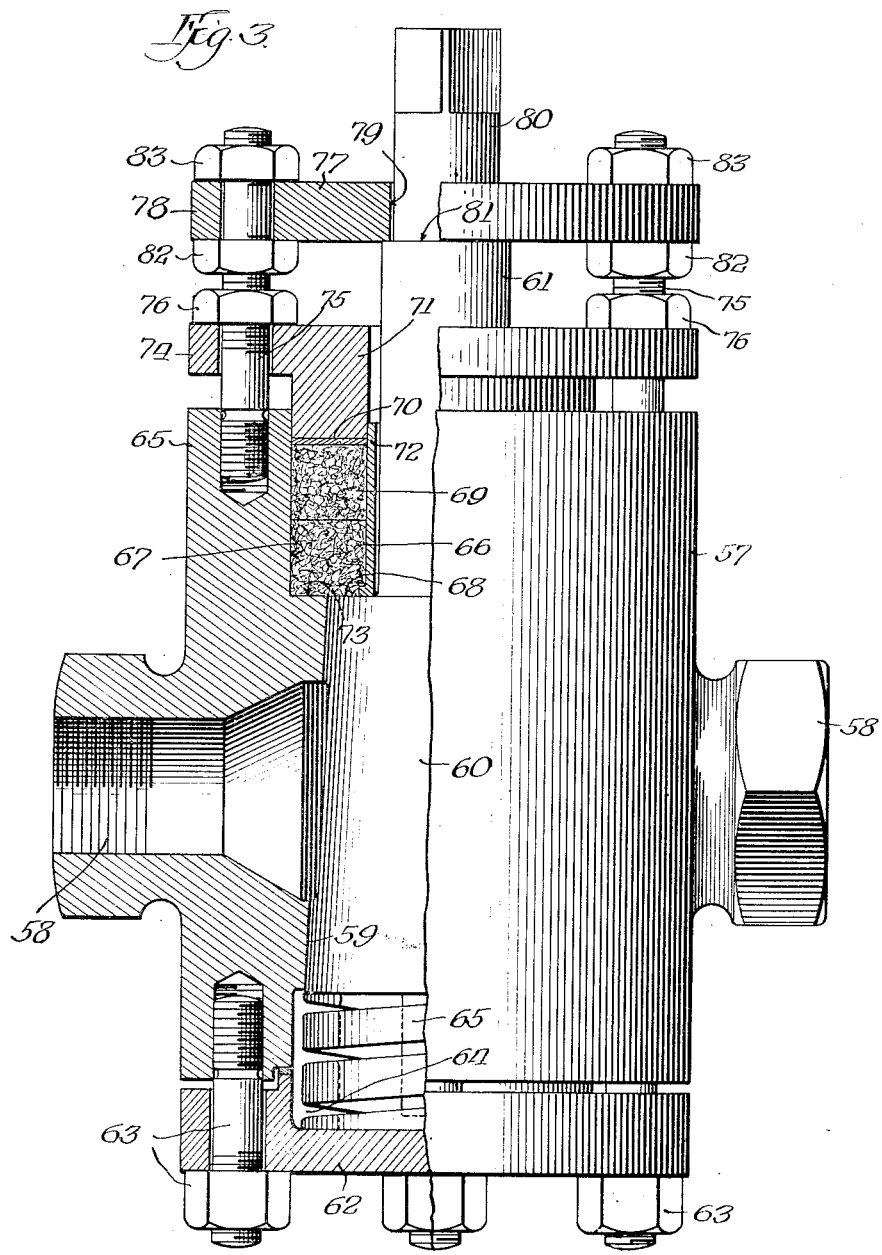
Figure 3 is a sectional view of an alternative form of this invention.

Referring now in detail to Figure 3, I provide a valve body having the walls thereof provided with fluid passageways 58 and having a valve seat 59. In the present instance the valve seat is generally tapering and a generally tapering plug member 60 engages said seat. The plug member 60 is provided with a valve stem 61 which projects from the upper open end of the body 57. The opposite end of the body is open but provided with a closure 62 secured in position by the provision of nuts and bolts 63, the closure having a recess 64 for the reception of a helical spring 65 interposed between said closure and the bottom of the valve 60 for maintaining the latter on its seat.

The upper end of the body 57 is formed with an annular wall 65 internally bored to form a smooth surface 66 terminating at its inner end in an annular shoulder 67. The valve stem 61 being smaller in diameter than the upper end of the valve 60, a shoulder 68 is afforded which is in a plane substantially coincidental with the shoulder 67.

I provide a suitable packing which may be formed of a series of split rings indicated at 69 and on top of this packing there is placed an annulus 70 against which a gland member 71 presses. To prevent expansion of the packing against the valve stem and to thereby relieve friction at this point, I provide a sleeve 72 placed from the valve stem and resting upon the shoulder 68. Retraction of the sleeve is prevented by the provision of an annular shoulder 73 on said sleeve which engages beneath the packing. The gland 71 is provided with an annular flange 74 apertured to accommodate a series of stud bolts 75 provided with suitable nuts 76 for forcing said gland against the packing.

In order to permit of displacement of the valve longitudinally with respect to and away from its seat, I provide an extra plate 77 suitably apertured as at 78 to receive the said bolts and also apertured as at 79 to accommodate the reduced outer portion 80 of the valve stem 61. The reduced outer portion 80 forms, with the valve stem 61, a shoulder 81 against which the plate 77 abuts. Lock nuts 82 are provided on the said bolt 75, and actuating nuts 83 are also provided for moving the plate toward the body 57 and thus lifting the valve off its seat without disturbing the packing. Furthermore, adjustment of the packing may be had without disturbance of the adjustment of the auxiliary plate. It will thus be seen that in this form of the invention I have incorporated means for preventing undue friction between the packing and the valve tending to render difficult rotation of the valve, and have also provided means for lifting the valve off its seat independently of the packing or the adjusting means of said packing.

It will thus be seen that in this form of the invention as well as in the form shown in Figure 1, the common function of the spring member in causing the valve to follow adjustments by the plate 77 are present as distinguished from prior art devices known to me wherein an adjustment is attempted by two or more sets of adjusting plates without the employment of a spring. In the present invention the provision of a spring and an adjusting means in the form shown, facilitates fine adjustments which is sometimes required in valves, particularly of the lubricating type wherein they are conducting acids or other corrosive fluids, which due to the valve assuming one position, either open or closed for long periods of time, may tend to cause a seizing of the valve and the seat so that while the valve was not moved from open to closed position over these long periods, lubricant is prevented from reaching the entire seating surface owing to the corrosive action of the fluid conducted through the valves. In the provision of the balancing means of the character of my invention, the possibility of corrosive action is substantially eliminated in that the adjusting means maintains the valve in a balanced position on its seat which will permit of the exudation of lubricant from the lubricant chamber to the entire surface of contact between the valve and its seat at all times upon an actuation of the compressor screw.

Having thus described my invention and illustrated its use, what I claim as new and desire to secure by Letters Patent is:

1. In a valve, a body having a tapered valve seat, a tapered valve member engaging said seat and having a stem at the smaller end projecting beyond said body, a packing for said stem, a spring member engaging the larger end of the valve member and tending to hold it on its seat, a lubricant chamber in the valve member in communication with the seating surface of the valve and seat, means for compressing lubricant in said chamber, a gland for compressing said packing, an adjusting plate abutting a part of the stem and having such connection therewith as to tend to move the valve only in a direction off its seat, bolts on the body passing through said plate and gland, nuts on said bolts for applying pressure to said plate against the tension of said spring to thereby cause said plate to move the valve member from its seat against the tension of said spring, said spring causing the valve member to closely follow the adjustment of the nuts for balancing the valve member in its seat, said spring also permitting movement of the valve member from its seat in response to pressure established in said lubricant chamber.

2. In a device of the character described, in combination, a casing having a seat portion, a member movable in said casing and engaging said seat, a packing device for said movable member comprising a packing element bearing on said body and movable member, a gland for compressing said packing element against said body and movable member, and means interposed between and in contact with said packing element, gland and movable member for facilitating movement of said movable member.

3. In a device of the character described, in combination, a casing having a seat portion, a member movable in said casing and engaging said seat, a packing device for said movable member comprising a packing element bearing on said body and movable member, a gland for compressing said packing element against said body and movable member, and means interposed between and in contact with said packing element, gland and movable member for facilitating movement of said movable member, said means being so constructed as to confine said packing to a relatively small bearing area on said casing and movable member.

4. In a device of the character described, in combination, a casing having a seat portion, a member movable in said casing and engaging said seat, a packing device for said movable member comprising a packing element bearing on said body and movable member, a gland for compressing said packing element against said body and movable member, and means interposed between and in contact with said packing element, gland and movable member but spaced away from a portion of the latter so as to reduce the relative surfaces of contact between said packing and said casing and movable member so as to facilitate movement of the latter.

5. In a device of the character described, in combination with a body having a seat, and a member movable relatively thereto, a packing device for said movable member comprising a packing element bearing on said body and member, a gland for compressing said packing element, and means interposed between and in contact with both said packing element and a portion of said movable member to facilitate movement of said valve member, said means having an extended portion spaced from said movable member, and said packing element being disposed between said gland and said extended portion.

6. In a device of the character described, in combination with a body having a seat, and a member movable relatively thereto, a packing device for said movable member comprising a packing element bearing on said body and member, a gland for compressing said packing element in contact with said body and valve member, and a pair of friction reducing means interposed between said body and a portion of said movable member, said packing element being interposed between the members of said pair.

7. In a device of the character described, in combination with a body having a seat, and a member movable relatively thereto, a packing device for said movable member comprising a packing element bearing on said body and member, a gland for compressing said packing element against said body and valve member, and a pair of friction reducing means interposed between said body and a portion of said movable member, one of said last mentioned means having an extended portion, and said packing element being interposed between the members of said pair.

8. A valve including a body having a seat, a valve member in said body engaging said seat, resilient means for holding said valve against its seat, means for packing said valve, a packing gland, means for partially relieving the valve from friction due to said packing, means for moving the valve against said resilient means, and common means for guiding said gland and supporting said valve moving means.

9. A valve including a body having a valve seat, a valve member arranged in said body of said seat, a valve stem projecting beyond said body, a packing for said stem in contact in part with said valve, a gland for said packing, means for holding a portion of said packing out of contact with the valve, means for moving the valve off its seat, and means common to said gland and valve moving means for supporting the valve moving means.

10. In a valve, a body having a valve seat, a valve member engaging said seat and having a stem projecting beyond said body, a packing for the body and valve in contact with a portion of each, means for compressing said packing, means for holding said packing out of contact with a portion of the valve, means for displacing the valve off its seat, and common means for guiding said compressing means and supporting said valve displacing means.

11. A valve including a body having a seat, a valve member in said body engaging said seat having a stem projecting beyond said body, resilient means for holding said valve against its seat, means for packing said valve, a packing gland, means for partially relieving the valve from friction due to said packing including an element between the stem and packing and serving to reduce the surface of contact between the valve and packing, means for moving the valve against said resilient means, and common means for guiding said gland and for supporting said valve moving means.

12. A valve including a body having a seat, a valve in said body engaging said seat and having a stem projecting beyond said body, resilient means for holding said valve against its seat, means for packing said valve including a packing, a gland and an element engaging the packing and spaced from the stem for partially relieving the valve from friction due to said last mentioned means, means for moving the valve against said resilient means, and common means for guiding said gland and supporting said valve moving means.

In testimony whereof, I have hereunto signed my name.

JESSE C. MARTIN, Jr.